US008028675B2

(12) United States Patent
Gagliano et al.

(10) Patent No.: US 8,028,675 B2
(45) Date of Patent: Oct. 4, 2011

(54) IGNITION SYSTEM FOR INTERNAL COMBUSTION ENGINE AND METHOD FOR INSTALLATION OF SAME

(75) Inventors: Howard Gagliano, Kingston, TN (US); Marion M. Satterfield, Oak Ridge, TN (US)

(73) Assignee: Econo Plug Technologies, Inc., Kingston, TN (US)

( * ) Notice: Subject to any disclaimer, the term of this patent is extended or adjusted under 35 U.S.C. 154(b) by 390 days.

(21) Appl. No.: 12/417,892

(22) Filed: Apr. 3, 2009

(65) Prior Publication Data

US 2009/0205468 A1 Aug. 20, 2009

Related U.S. Application Data

(63) Continuation-in-part of application No. 12/109,795, filed on Apr. 25, 2008, now Pat. No. 7,798,118, which is a continuation-in-part of application No. 12/031,229, filed on Feb. 14, 2008, now Pat. No. 7,637,239.

(51) Int. Cl.
*F02B 19/12* (2006.01)
*F02B 19/00* (2006.01)

(52) U.S. Cl. ........................................ 123/266; 123/293

(58) Field of Classification Search .................. 123/266, 123/260, 273, 268, 293, 169 PA, 144, 146.5 R; 313/143; 29/720, 888.01, 888.011; 81/124.6, 81/3.29, 114, 121.1
See application file for complete search history.

(56) References Cited

U.S. PATENT DOCUMENTS

| | | | |
|---|---|---|---|
| 4,542,724 A * | 9/1985 | Blais | 123/266 |
| 4,646,695 A | 3/1987 | Blackburn | |
| 4,696,269 A | 9/1987 | Blackburn | |
| 7,104,246 B1 * | 9/2006 | Gagliano et al. | 123/266 |

* cited by examiner

*Primary Examiner* — Mahmoud Gimie
(74) *Attorney, Agent, or Firm* — Pitts, Lake & Bell, PC

(57) ABSTRACT

A novel method and apparatus useful for the installation of a flame cone within a respective throughbore in the head of an ICE having a pre-ignition system without removal of the head from the ICE, followed by threading a spark plug into the outboard end of the flame cone. This installation is effected from a location external of the head and while the head is affixed in covering relationship to one or more combustion chambers of the internal combustion engine. The installation further comprises employing unique interconnection between the flame cone and an installation tool. The flame cone includes a rotational position indicator which is aligned with an exit port in the flame cone and which contributes to the exclusivity of mating interconnection with the tool in a manner which converts rotational movements of the tool to like rotational movements of the flame cone, hence like rotation of the location of the exit port.

9 Claims, 11 Drawing Sheets

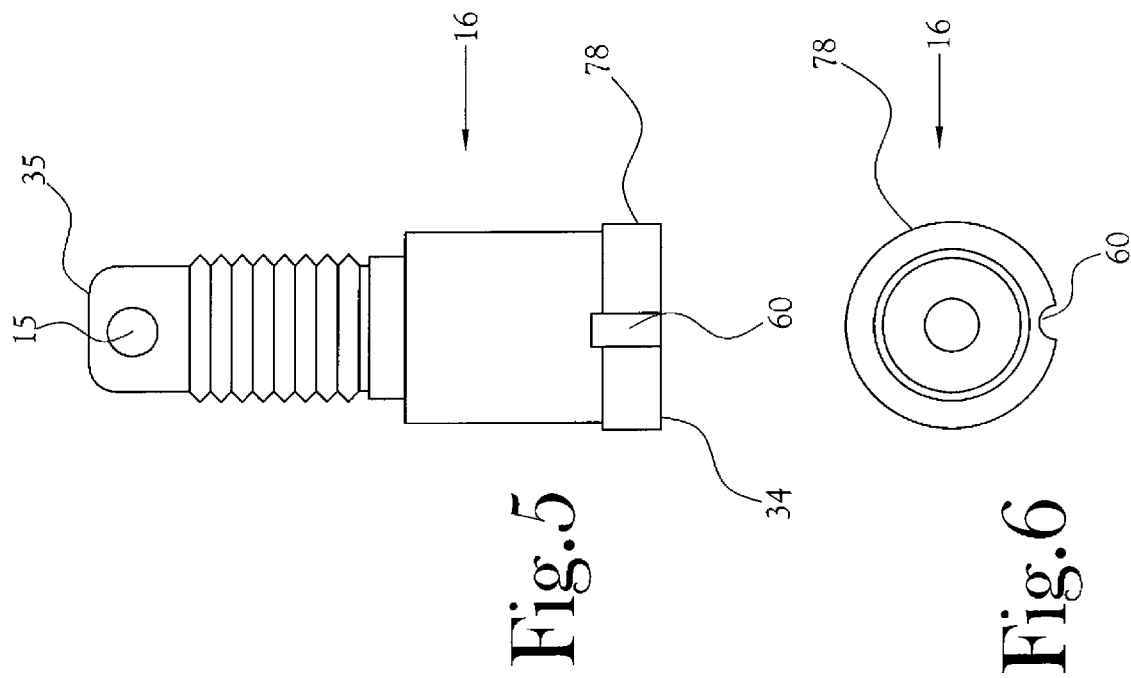
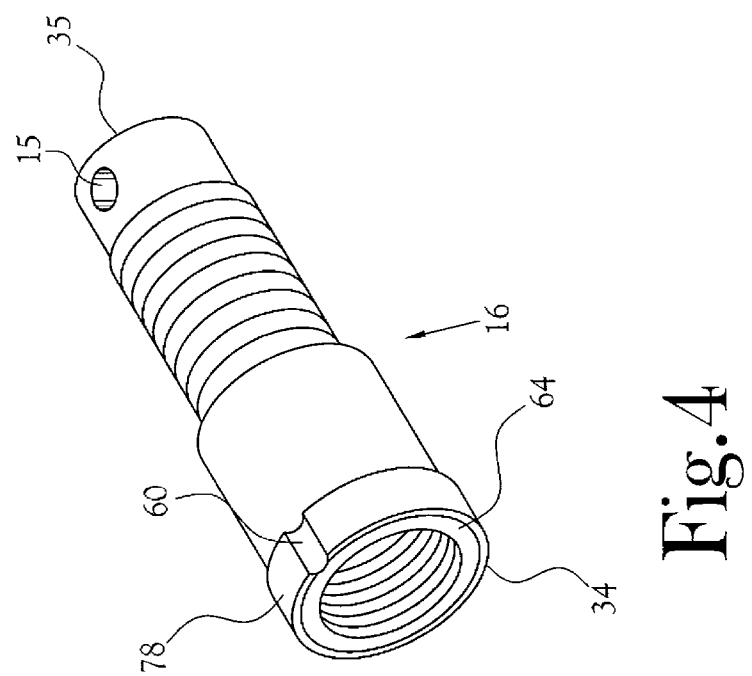

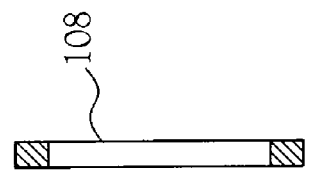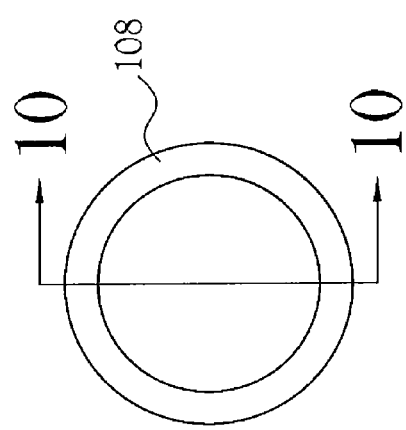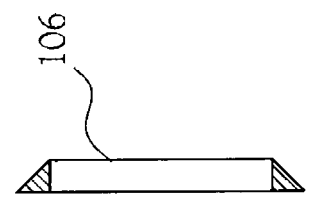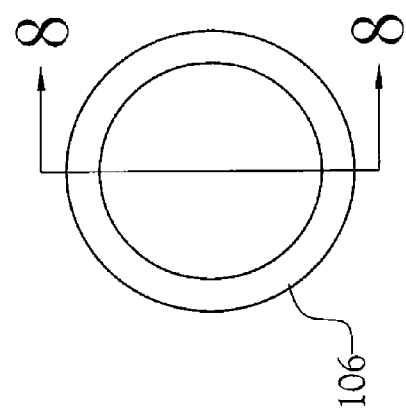

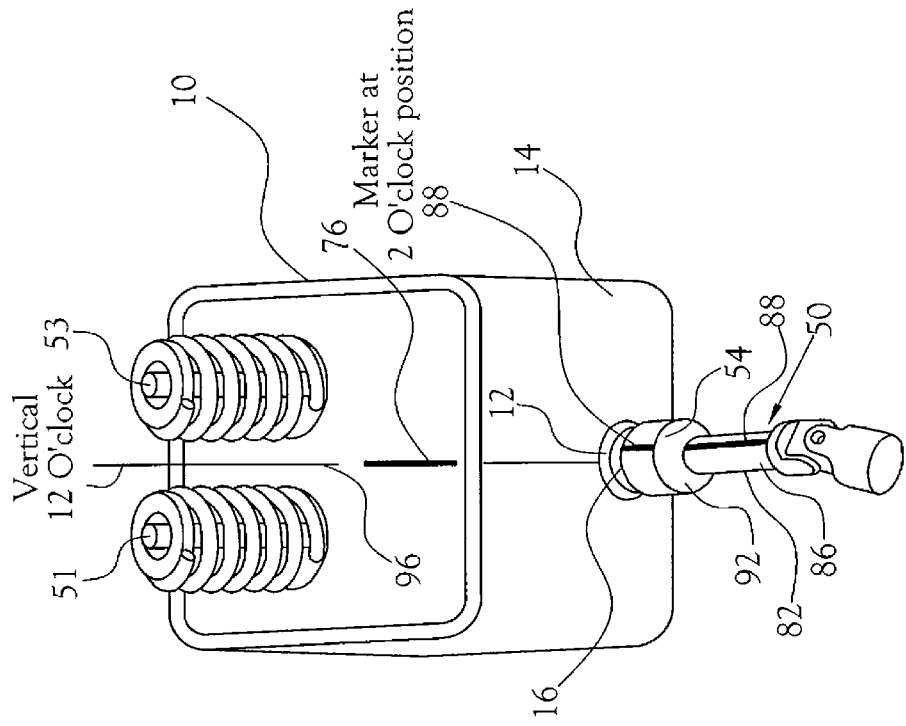
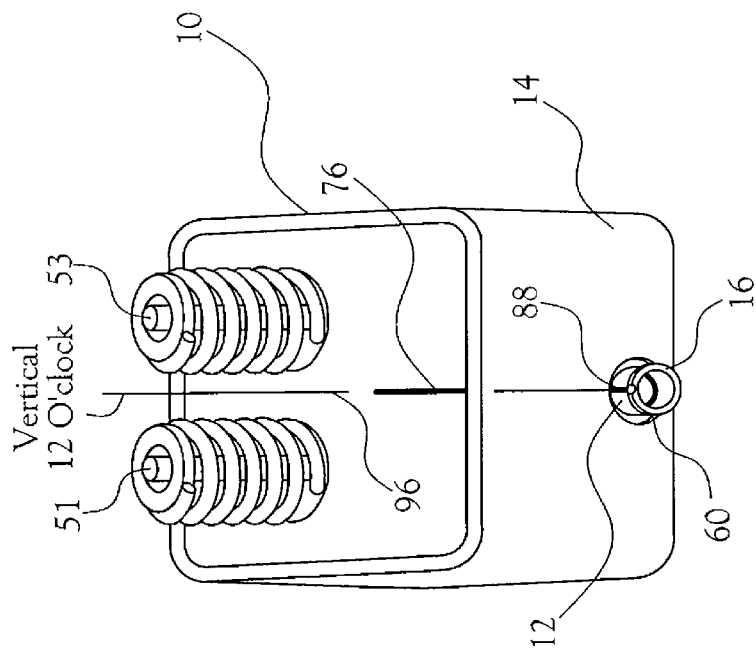
Fig. 15
Fig. 14

| Location of Tool marker | Washer Thickness In |
|---|---|
| 12 O'clock | 0.010 |
| 1 O'clock | 0.014 |
| 2 O'clock | 0.018 |
| 3 O'clock | 0.022 |
| 4 O'Clock | 0.026 |
| 5 O'clock | 0.030 |
| 6 O'clock | 0.034 |
| 7 O'clock | 0.038 |
| 8 O'clock | 0.042 |
| 9 O'clock | 0.046 |
| 10 O'clock | 0.050 |
| 11 O'clock | 0.054 |

Fig.16

IGNITION SYSTEM FOR INTERNAL COMBUSTION ENGINE AND METHOD FOR INSTALLATION OF SAME

CROSS-REFERENCE TO RELATED APPLICATIONS

This application is a continuation in part of U.S. patent application Ser. No. 12/109,795 entitled: METHOD AND APPARATUS FOR INCORPORATION OF A FLAME FRONT-TYPE IGNITION SYSTEM INTO AN INTERNAL COMBUSTION ENGINE, filed Apr. 25, 2008 now U.S. Pat. No. 7,798,118, and is a continuation in part of U.S. patent application Ser. No. 12/031,229, entitled: METHOD AND APPARATUS FOR ENHANCING THE EFFICIENCY OF OPERATION OF AN INTERNAL COMBUSTION ENGINE, filed Feb. 14, 2008 now U.S. Pat. No. 7,637,239, the whole of each of the aforesaid by reference and upon which priority is claimed.

STATEMENT REGARDING FEDERALLY SPONSORED RESEARCH OR DEVELOPMENT

No government rights.

FIELD OF INVENTION

This invention is related to ignition systems, and particularly flame front-type pre-ignition systems, for internal combustion engines (ICE) which employ a conventional spark plug mounted in a throughbore defined through the wall of the head of an ICE from a location external of the head of the engine and extending into a combustion chamber of the ICE which houses at least and intake valve and an exhaust valve. In such system, there is disposed a flame cone adapted to direct one or more flame fronts, originated externally of the combustion chamber into the combustion chamber in one or more predetermined directions chosen to enhance the combustion of a fuel mixture within the combustion chamber.

BACKGROUND OF INVENTION

It has been proposed by the present inventors to employ multiple flame fronts emanating from a pre-ignition system located externally of the combustion chamber of an ICE as the ignition source for a fuel mixture disposed within the combustion chamber. In such arrangements the orientation of each flame front upon its entry into the combustion chamber is of strong importance, such orientation being a determining factor with respect to the effectiveness of the timing of initiation of combustion of different portions of the fuel mixture distributed within the combustion chamber, and the speed and/or direction of propagation of such flame fronts through the fuel mixture. To this end, it has been proposed that the flame front generated externally of the combustion chamber be divided into individual flame fronts by means of a flame cone or like device which is interposed between the spark plug and the combustion chamber, and that the introduction of such individual flame fronts consistently be properly oriented upon their entry into the combustion chamber. In the present system, this division of the initial flame front into multiple flame fronts is accomplished using multiple exit ports defined in that end of the flame cone which is exposed to the combustion chamber. The orientation of such exit ports sets the angular directionality and/or the timing of flame fronts from each of such exit ports, into the combustion chamber. This required angular orientation of the exit ports is complicated in that when inserting such flame cones into the existing throughbores in the head of an ICE, one has no visual access to the interior of the combustion chamber without removal of the head from the ICE. Under these circumstances rotational alignment of such exit ports is quite problematical. Thus, the after-market use of flame cones can be hampered due to the effort required to install properly rotationally oriented flame cones into the individual combustion chambers of a multi-chambered ICE. One solution to this problem discovered by the present inventors is the use of indicia applied to the outer rim of the flame cone and a "standard" marker applied to the outer rim of each throughbore, the concept being to use the indicia on the installed flame cone as a measure of the accuracy of the angular alignment of the flame cone exit ports within the combustion chamber when the flame cone is seated within its respective throughbore in the head of the ICE. Whereas this technique is operable, among other things, such technique fails to provide the required assurance that the installer will not select improper combinations of flame cones and the tool(s) employed in the process of installing the flame cone within the throughbore, resulting in improper alignment of the flame cone (and its exit ports) within the internal combustion chamber of the ICE. Particularly, recognizing that the internal threading of each throughbore is subject to being somewhat different for each throughbore of even the same ICE, the installation factor can be disturbing to issuers of product liability insurance to manufacturers of flame cones in particular, for example, thereby creating a potential detriment to the marketability of the foregoing described installation technique. Moreover, because the angular orientation of the exit ports of the flame cone are so critical to successful operation of the ignition system, maximization of the accuracy of the orientation of the exit ports of the flame cone within the combustion chamber is most desirable, even when the installation is performed by relatively untrained ICE mechanics.

BRIEF DESCRIPTION OF THE FIGURES

FIG. 4 is a representation of a flame cone embodying various of the features of the present invention;

FIG. 5 is a side elevation view of a flame cone as depicted in FIG. 4;

FIG. 6 is a top end view of the flame cone depicted in FIG. 4;

FIG. 7 is a top view of one embodiment of a conical washer employed in the present invention;

FIG. 8 is a side view, in section, of the conical washer depicted in FIG. 7;

FIG. 9 is a top view of one embodiment of a flat washer employed in the present invention;

FIG. 10 is a side view, in section, of the flat washer depicted in FIG. 9;

FIG. 14 is a schematic representation of a portion of the head wall of an ICE and illustrating one embodiment of the proper rotational position of a flame cone threaded into the throughbore of the head wall;

FIG. 15 is a schematic representation of a portion of the head wall of an ICE and illustrating the clock face technique for analyzing the rotational position of a flame cone threaded into the outboard open end of a throughbore extending through the thickness of the head wall, and employing a tool of the present invention;

FIG. 16 is one embodiment of a lookup table relating the thicknesses of various spacer washers associated with respective variations in the O'clock position of the rotational position marker on the tool of the present invention;

SUMMARY OF THE INVENTION

In accordance with one aspect of the present invention, the present inventors provide a novel method and apparatus useful for the installation of a flame cone within a respective internally threaded throughbore in the head of an ICE having a pre-ignition system, without removal of the head from the ICE, followed by threading a spark plug into the outboard end of the flame cone. This installation is effected from a location external of the head and while the head is affixed in covering relationship to one or more combustion chambers of the internal combustion engine. The installation further comprises employing unique interconnection between the flame cone and an installation tool. The flame cone includes a rotational position indicator which is aligned with an exit port in the flame cone and which contributes to the exclusivity of mating interconnection with the tool in a manner which converts rotational movements of the tool to like rotational movements of the flame cone, hence like rotation of the location of the exit port. By this means, the installer can visually observe rotational movements of the tool and be assured that the exit port within the combustion chamber is likewise rotationally oriented. Further, provision is made for correlation of the observed rotational movement of the tool with a marker provided on the head of the ICE proximate the throughbore thereby permitting use of the clock face technique for judging the degree of alignment or misalignment of the flame cone, hence the exit port, relative to the proper seated attitude of the flame cone within the throughbore. Adjustment of the permissible depth of insertion of the flame cone into the throughbore, hence the alignment of the tool marker with the head marker is provided by spacer washers whose respective thicknesses are correlated via a lookup table, to individual hour positions relative to a 12 O'clock position marker on the head of the ICE. Accordingly, any rotational misalignment of the seated flame core and its exit port may be changed by introducing an appropriate spacer washer between the flame cone and a seating stop provided internally of the flame cone.

Figure 1:
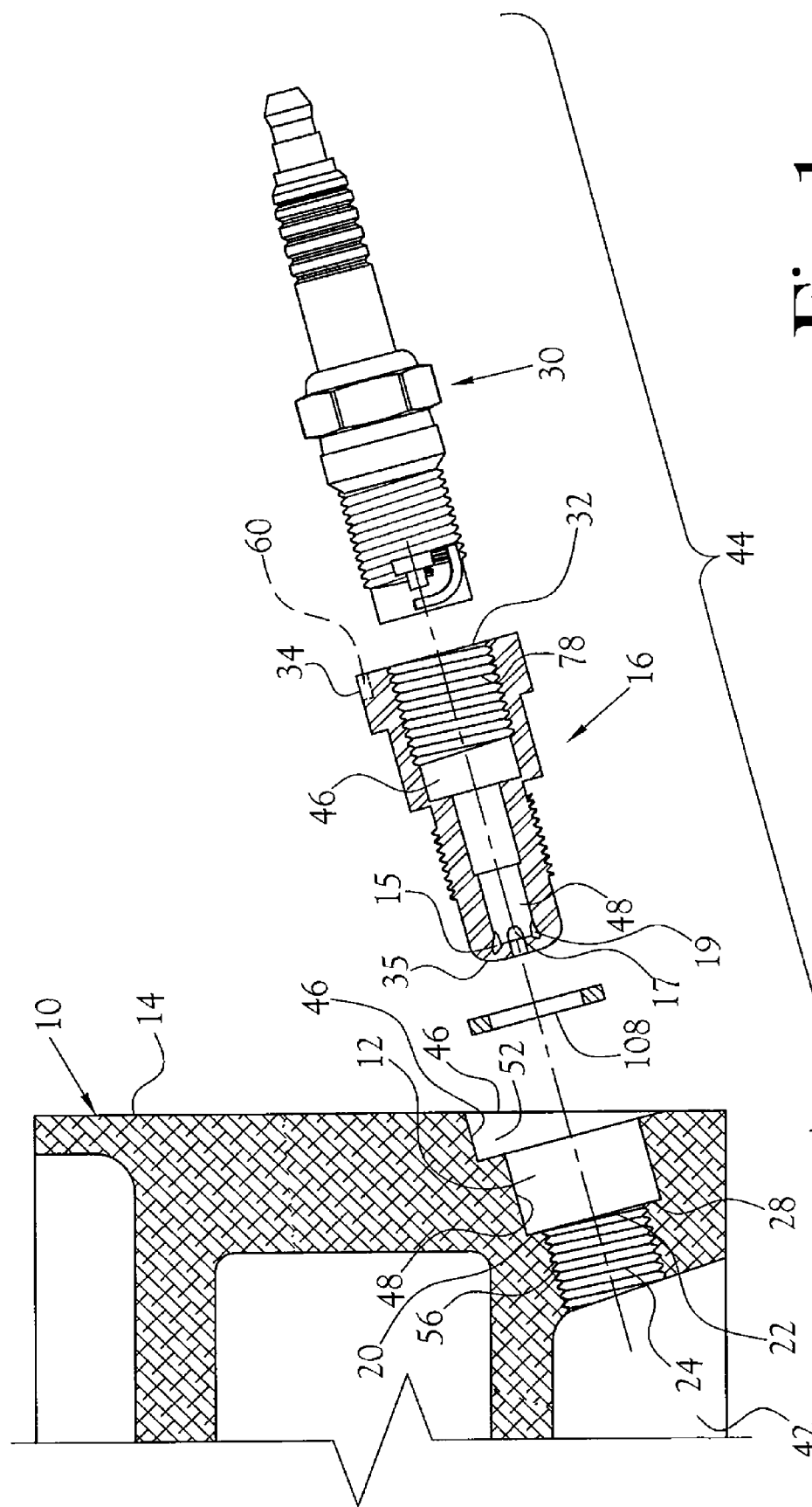
FIG. 1 is a schematic representation of a portion of a head of an ICE and depicting a flame cone and spark plug in exploded view and including a flat spacer washer of the present invention.

In FIG. 1, there is depicted a partially exploded view of a portion of the head 10 of an ICE, a typical throughbore 12 through the wall 14 of the head and having a circumferential shoulder 20 defined internally of the throughbore, a flame cone 16, having one or more exit ports 15, 17 and 19, and a conventional spark plug 30.

Figure 2:
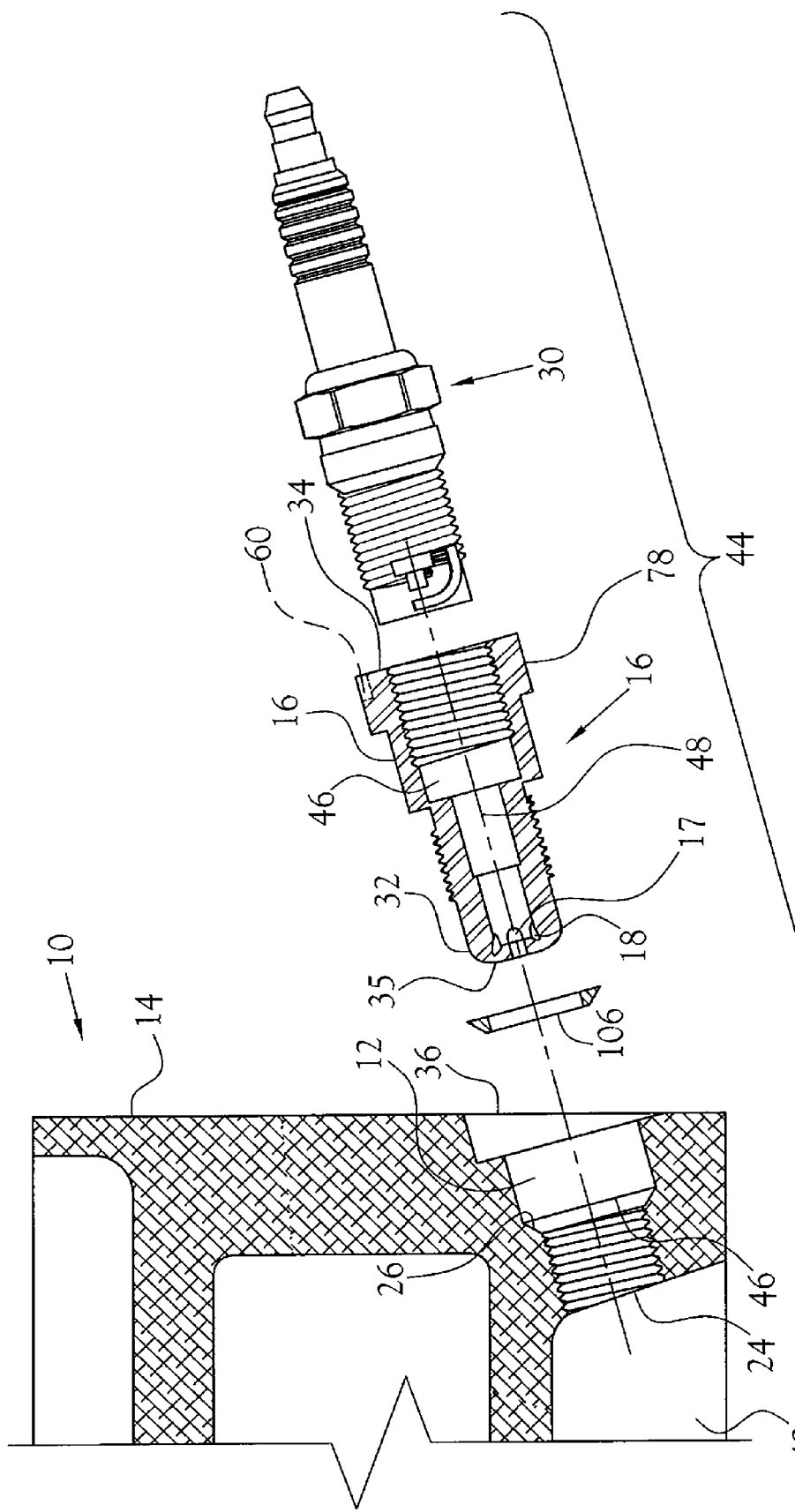
FIG. 2 is a schematic representation of a portion of a head of an ICE as depicted in FIG. 1 and including a conical washer of the present invention.
Figure 3:
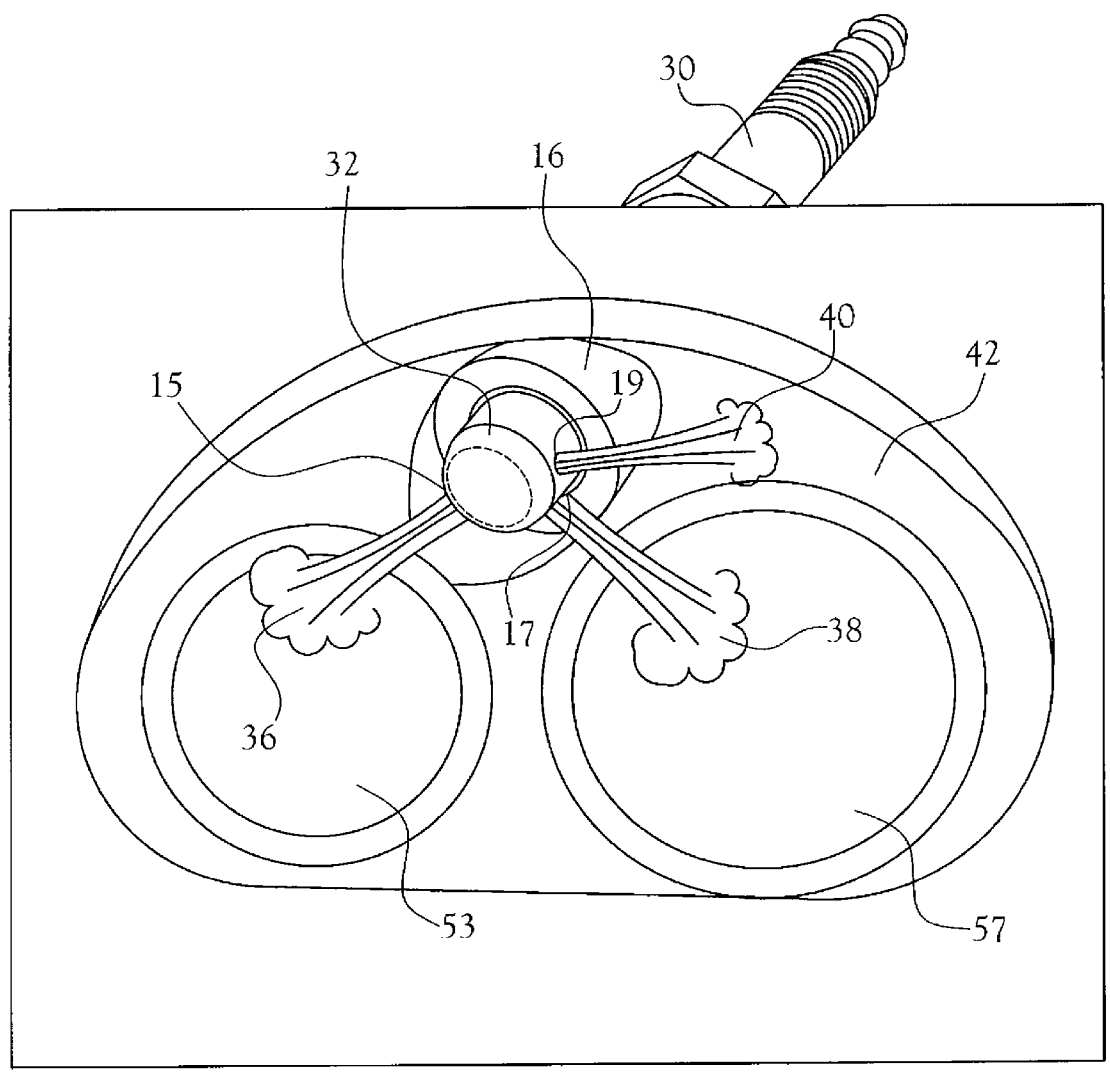
FIG. 3 is a schematic representation of a portion of an ICE combustion chamber and depicting the directionality of various flame fronts entering the combustion chamber of an ICE.

Referring to FIGS. 1, 2 and 3 of the present application, it will be noted that the desired orientations of the multiple exit ports 15, 17, and 19 through which multiple flame fronts 36, 38 and 40 enter the combustion chamber 46 (See FIG. 3) are determined analytically once the internal geometry of the combustion chamber is known. Determining the internal geometry of the combustion chamber requires access to the design data for the ICE, or it must be determined by examination of the disassembled engine, all as is well known to those skilled in the art. In accordance with one aspect of the present invention, the flame fronts 36, 38 and 40 from respective individual ones of the exit ports 15, 17 and 19 of the flame cone are directed along predetermined paths selected to maximize the simultaneity and completeness of the ignition of the fuel/air mixture disposed within the combustion chamber.

In one embodiment of the present invention, as depicted in FIG. 1, the pre-ignition system 44 includes a flame cone 16, a pre-combustion chamber 46 defined in the inboard end 34 of the flame cone, at least one flame front exit channel 48 defined in the flame cone and leading from the pre-combustion chamber toward the combustion chamber 42 of the ICE, and one or more exit ports 15, 17 and 18 in the outboard end 35 of the flame cone and opening into the combustion chamber 42 of the ICE.

Referring initially to FIG. 1, in the present invention, the flame cone provided by the present inventors is adapted to be threadably inserted into the conventional internally threaded throughbore defined in the head wall 14 of an ICE. The depicted throughbore in the head wall of the ICE includes a circumferential shoulder 20 internally thereof and adjacent the inboard end 22 of the internal threads 24 of the throughbore. This shoulder defines a stop for the extent (depth) of threading a flame cone, as employed in the present invention, into the internally threaded throughbore. This circumferential shoulder may be concave or flat depending upon the ICE in question. FIG. 1 depicts a flat shoulder 20 and FIG. 2 depicts a conical shoulder 26. Once the flame cone is properly seated at the required depth within the throughbore, a conventional spark plug 30 is threadably inserted into the internally threaded inboard end of the flame cone.

In one embodiment of the method of the present invention, the inventors place either a thin flat 108 or concave 106 metal washer (See FIGS. 1,2 and 7-10) on the externally threaded outboard end 35 of the flame cone to provide repeatable stopping (seating) of the depth of threading of the flame cone into the throughbore when the washer engages the shoulder within the throughbore.

In the present invention, as depicted in FIGS. 1 and 3-6, the rotational orientation about the outer circumference 78 of the flame cone of a preselected one of the exit ports 15 (for example), proximate the outboard end 35 of the flame cone 16 is mimicked by a like rotationally oriented physical structural feature in the form of an elongated groove 60 denominated herein at times as a rotational position indicator on the outer circumferential wall 78 of the flame cone proximate the inboard end 34 of the flame cone. Through this means, any rotational positioning of the flame cone within the throughbore 12 produces like rotation within the combustion chamber of the exit port 15 (for example), which is aligned with the rotational positioning indicator (groove 60).

This structural feature on the inboard end of the flame cone normally is not visible to the installer from their position external of the head in that such structural feature is engaged and covered by a unique installation tool 50 of the present invention and thereby not visible to the installer.

Figure 11:
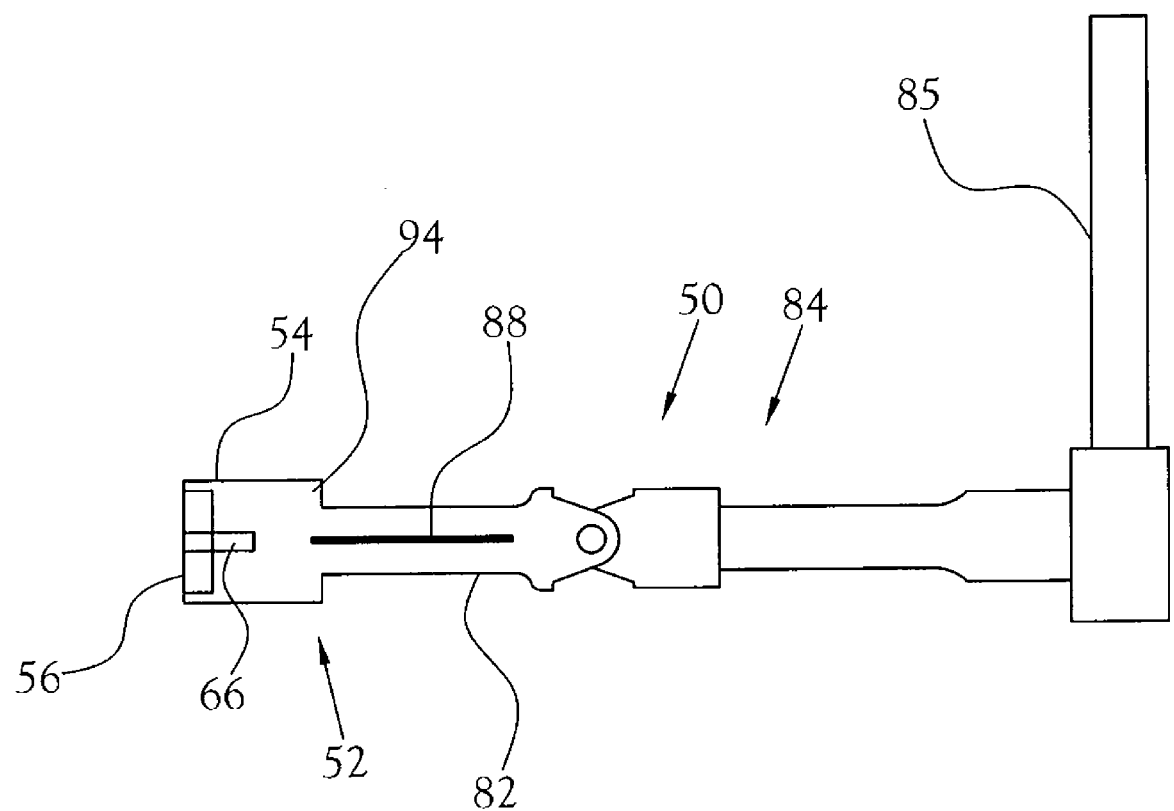
FIG. 11 is a representation of one embodiment of a tool of the present invention comprising a flexible extension adapted to be exclusively fitted into a socket which in turn is adapted to engage the inboard end of a flame cone for threading the flame cone into a throughbore.
Figure 12:
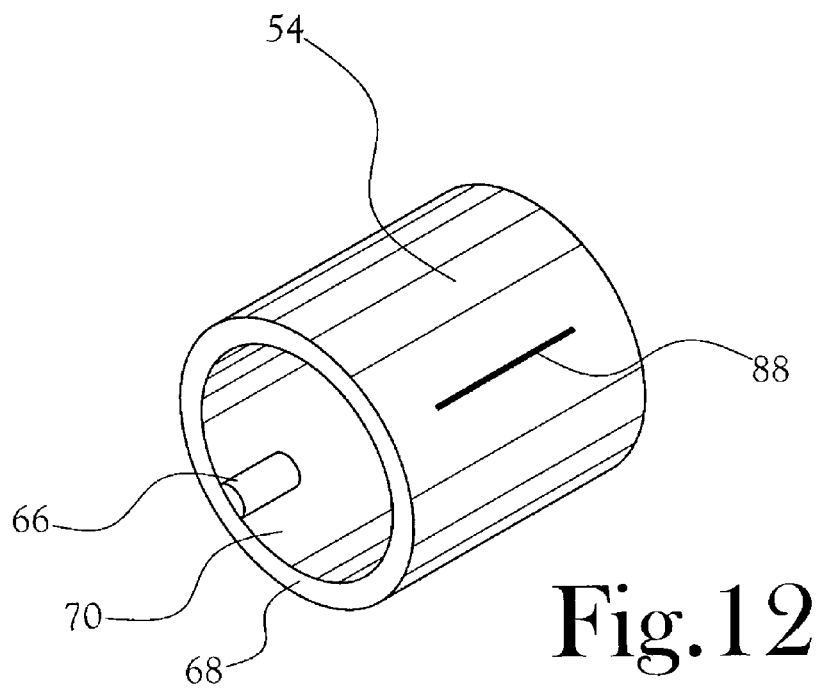
FIG. 12 is a representation of the first end view of the socket element and depicting the unique geometrical cavity defined within such first end of the socket element.
Figure 17:
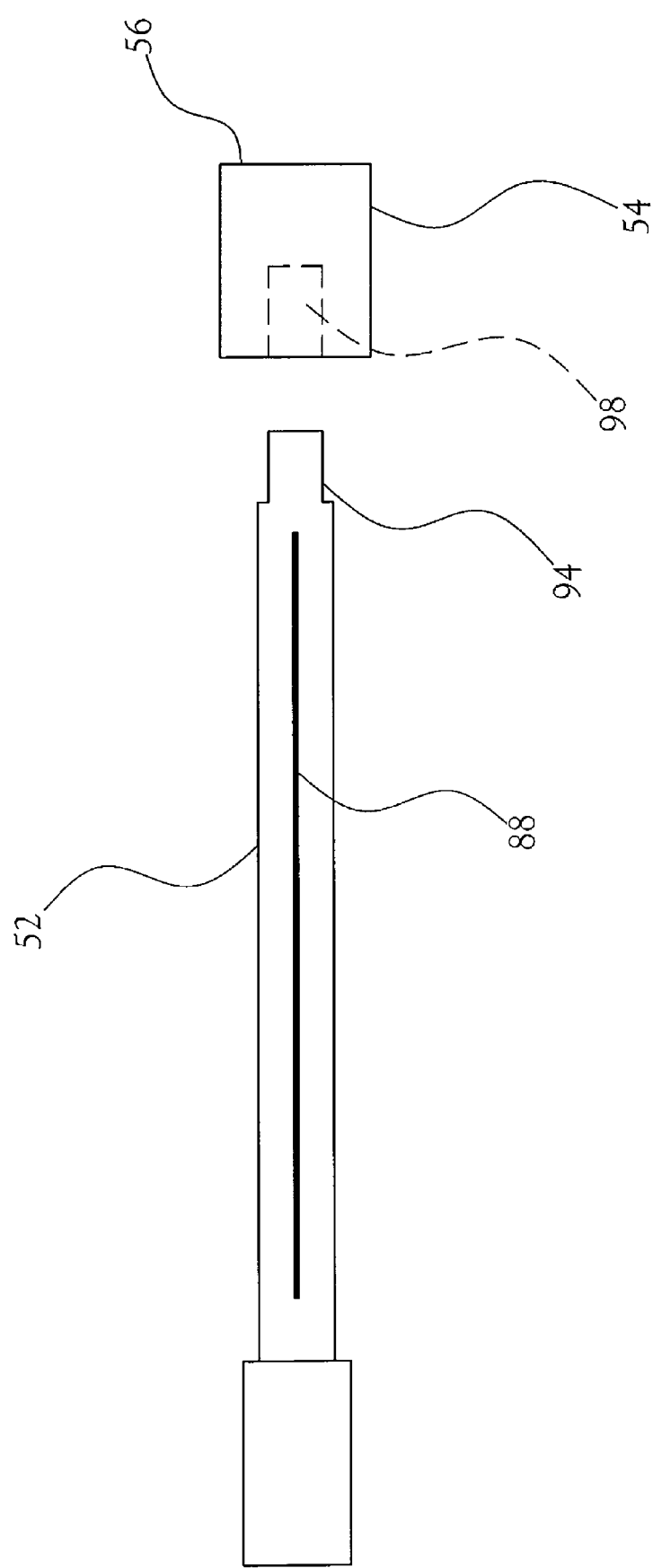
FIG. 17 is an exploded view of one embodiment of a tool of the present invention and depicting socket and extension elements of such depicted tool.
Figure 18:
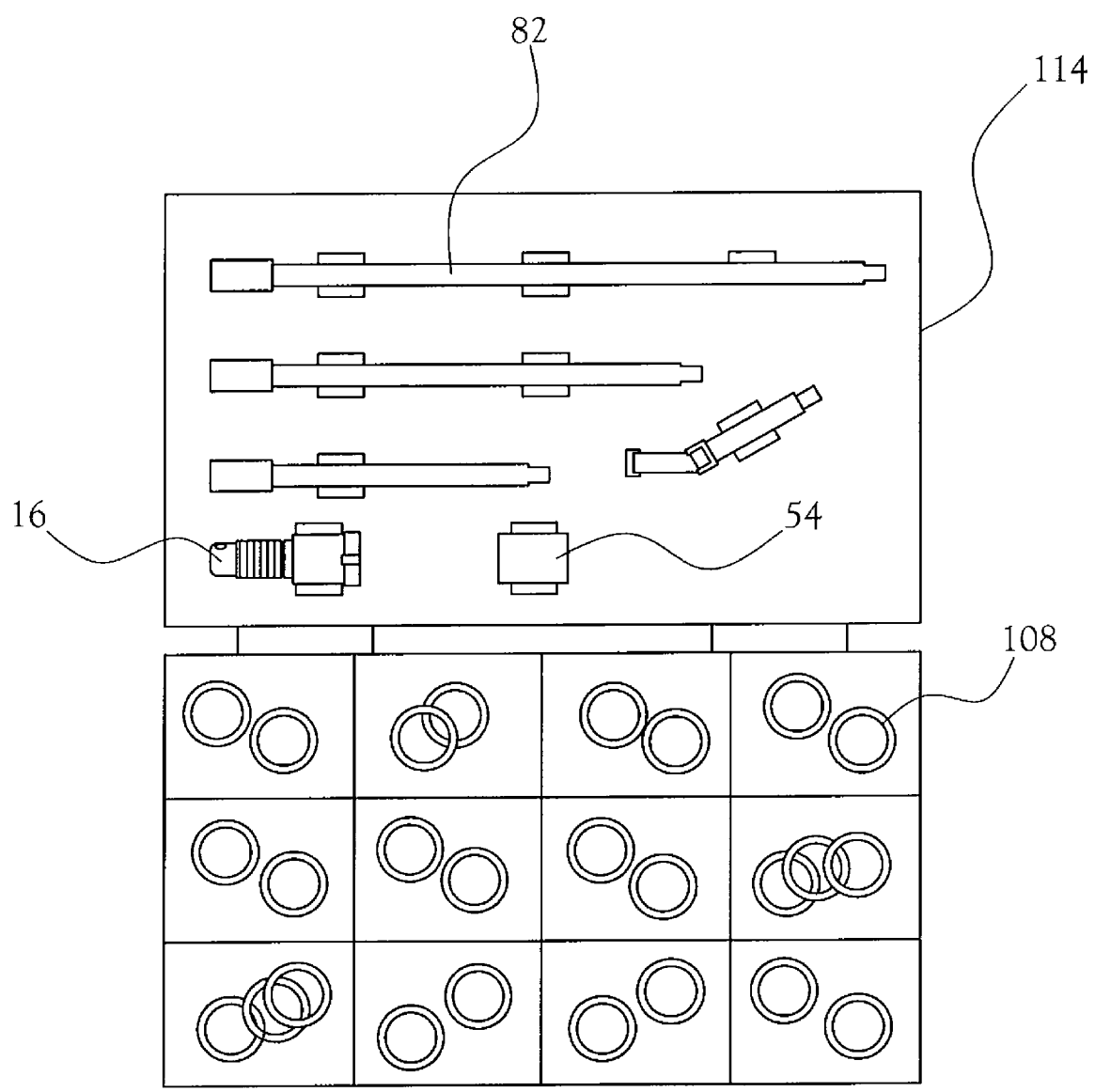
FIG. 18 is a representation of one embodiment of a kit comprising a flame cone, a tool socket, multiple length extensions and a flexible extension, which are adapted to be connectable to the socket, and a plurality of spacer washers of differing thicknesses, all housed a clam shell type container.

Embodiments of the tool 50 of the present invention are depicted in FIGS. 11, 15, and 17. Each embodiment comprises a socket element 54 which is provided with a physical structural feature e.g., an elongated ridge 66 (see FIG. 12), which, as noted, is geometrically matingly complementary to the rotational position indicator (groove 60) on the exposed inboard end 34 of the flame cone and whose location mimics the rotational position on the flame cone of at least a selected one of the exit ports (15 for example). The complementary mating of the tool with the flame cone is exclusive in nature. That is, the geometry of the inboard end of the flame cone and the geometry of that portion of the socket element which engages the flame cone are matingly complementary so that only the tool of the present invention, to the exclusion of all known pre-existing tools, will be accepted on the inboard end of the flame cone for effecting rotational movement of the flame cone within its throughbore. The tool of the present invention further includes an extension element 82 having one end 94 thereof contoured to be exclusively received within a second end 56 of the socket. The tool depicted in FIG. 11 also comprises a consolidated flexible coupling 84 interposed between the extension 82 and a conventional racket wrench 85.

Further, the tool depicted in FIG. 11 is provided with a visual rotation position tool marker 88 which, when the tool is in engaging relationship with the flame cone, it is rotationally aligned with the rotational position indicator of the flame cone. Thus, visual observation of the rotational position of the tool marker 88 provides an installer with a "visual" reference to the rotational position of the flame cone, hence the mimicked rotationally aligned exit port which is disposed within the combustion chamber. As a result, when the flame cone is threaded in proper seating relationship to the shoulder within the throughbore employing the novel tool of the present invention and the torque value specified by the manufacturer of the ICE, the installer may have visual evidence of the rotational position of the selected exit port of the flame cone.

Referring to FIGS. 4-6, in one embodiment of the present invention, the physical structural rotation indicator feature proximate the inboard end 34 of the flame cone comprises an elongated groove 60 defined in the external outer surface 62 of a flame cone and extending from the outer rim 64 of the inboard end of the flame cone inwardly of the flame cone along the length of the flame cone for a distance of about one-eighth (for example) of the overall length of the flame cone. The length, depth and geometry of this groove are chosen to ensure sufficient surface area that the ridge on the socket of the tool of the present invention is operatively retained within the groove when the tool is applied to the inboard end of the flame cone.

The tool 50 of the present invention is adapted to be employed for threading the flame cone into the throughbore and as noted is uniquely designed to exclusively engage the inboard end of the flame cone for rotation of the flame cone. In the embodiment, depicting in FIGS. 11-13, 15, 17 and 18 this tool includes a first end 52 which may be in the form of an open socket 54, for example, which includes an elongated ridge 66 disposed internally of the socket and extending from the rim 68 of the socket into a first cavity 70 of the socket by a distance sufficient to provide a length of the ridge which is substantially the same as the length of the groove 60 in the inboard end of the flame cone, and a height thereof which is substantially the same as the depth of the groove. By this means, the ridge 66 of the rocket is adapted to be snugly and operatively received within the groove 60 in the exterior wall 70 of the inboard end of the flame cone. This first socket cavity 70 is geometrically designed to provide an internal cavity of a size and depth suitable to matingly and snugly receive within such cavity the outer circumference 78 of the inboard end of the flame cone, thereby assuring full engagement of the socket with the inboard end of the flame cone.

By this means, the only tool adapted to be fitted onto the inboard end of the flame cone is the tool of the present invention. Therefore, an installer can not "mix and match" any known existing tool or combination of tools which are not adapted to be applied to the flame cone in a manner which always assumes a fixed established alignment of the tool with the flame cone in a chosen registered rotational position, as an aid in the threading of the flame cone into the throughbore in accordance with the present invention. This mode of interconnection of the socket (tool) with the flame cone therefore provides a first mode of assuring proper installation of the flame cone within the throughbore to achieve the required assurance that the exit port(s) of the flame cone are properly angularly positioned within the combustion chamber of the ICE.

It is to be noted that the tool must include a surface which is visually available to the installer and which is capable of readily displaying the marker 88 on the tool, such as a colored straight line applied to the tool. Second, the marker must be located at the same rotational position as is the structural rotational positional indicator (groove 60) of the flame cone when the tool is engaged with the inboard end of the flame cone. Since the socket can only engage the flame cone in a single common rotational position, if the socket is physically adaptable for the application of a marker to the side of the socket at a location and of a size where it is readily visible to the installer, such a location of the marker is permissible. However, the present inventors prefer that the socket be affixed or releasably joined to an extension 82 which has an elongated exposed surface 86 onto which the elongated tool marker 88 (e.g., a colored straight line drawn parallel to the length of the extension) may be applied. Such a marker has been found to be readily visible to an installer.

In as much as the contoured first cavity 70 on the first end of the socket which engages the flame cone provides the advantage of exclusive fitting of the socket onto the flame cone in only one rotational orientation of the socket relative to the flame cone, there is opened the possibility that the socket can also be exclusively fitted at its opposite second end 80 to an auxiliary complementary component namely an extension 82, for the tool.

Figure 13:
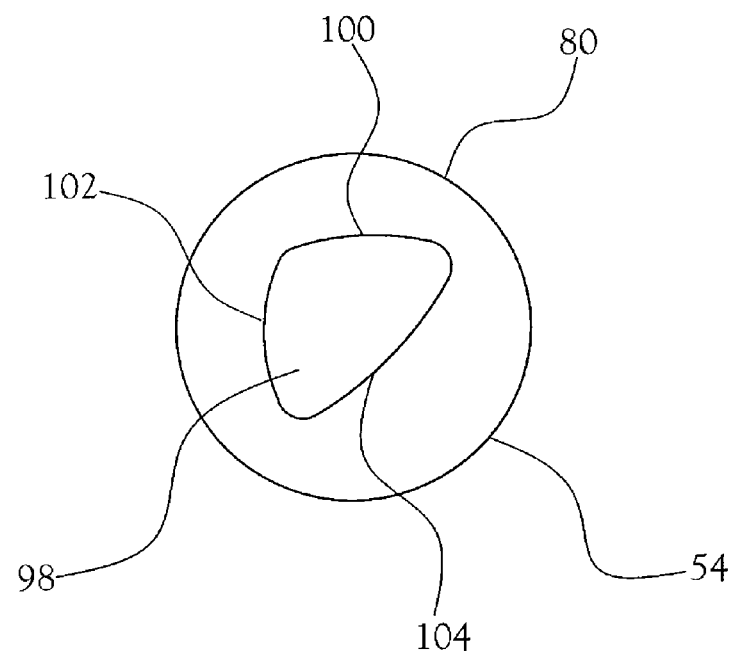
FIG. 13 is a second end view of the socket element depicted in FIG. 14 and depicting the unique geometrical cavity defined with such second end of the socket.

Referring to FIG. 13, in taking advantage of the latter possibility, in one embodiment, the present inventors provide the second end 80 of the socket which is outboard of the interconnection of the socket with the end of the flame cone, with a uniquely contoured second cavity 98 adapted to receive therein only a matingly uniquely contoured end 94 of the elongated extension, for example, so that such end of the extension will only matingly fit into the unique geometry of the second cavity within the outboard end of the socket. Such extensions may be provided in different lengths (see FIG. 18) to further enhance access by the installer to the flame cone where access to throughbores is restricted, or encumbered by components of the ICE which are located adjacent the head. This unique geometry of the cavity in the second end of the socket is different from the geometry of the inboard end of the flame cone so that the extensions may not be directly connected to a flame cone. The unique design of the outboard end of the socket, there may be defined within the outboard second end 80 of the socket, a second cavity 98 having a cross-section in the general form of a triangle (see FIG. 13) having an outwardly slightly curved base 100 and first and second sides 102 and 104, each side also being slightly outwardly curved. In this embodiment, each separate elongated extension is contoured at one end 94 thereof with a cross section of complementary mating geometry with the second cavity defined in the outboard end of the socket. In this embodiment, the contoured 94 end of the extension may be releasably insertable into the triangular second cavity in the socket, thereby connecting the socket on the end of the extension to provide a longer "reach" for accessing a flame cone to be installed in a throughbore of the ICE.

In either of the foregoing embodiments, the extension presents an elongated outer surface onto which there may be provided an elongated straight line marker (colored, for example). As noted, this marker is positioned on the extension so as to be aligned in register with the 12 O'clock marker when it is engaged with the rotational position indicator on the flame plug and therefore is suitable for indicating the rotational position of the flame cone and its exit ports.

Referring to FIGS. 4-6, in one embodiment of the present invention, the physical structural rotation indicator feature proximate the inboard end 34 of the flame cone comprises an elongated groove 60 defined in the external outer surface 62 of a flame cone and extending from the outer rim 64 of the inboard end of the flame cone inwardly of the flame cone along the length of the flame cone for a distance of about one-eighth (for example) of the overall length of the flame cone. The length, depth and geometry of this groove are chosen to ensure sufficient surface area and that the tool of the present invention is operatively retained within the groove when the tool is applied to the inboard end of the flame cone.

The tool 50 of the present invention is adapted to be employed for threading the flame cone into the throughbore and as noted is uniquely designed to exclusively engage the inboard end of the flame cone for rotation of the flame cone. In the embodiment, depicting in FIG. 11, this tool includes a first end 52 which may be in the form of an open socket 54, for example, which includes an elongated ridge 66 disposed internally of the socket and extending from the rim 68 of the socket into a first cavity 70 of the socket by a distance sufficient to provide a length of the ridge which is substantially the same as the length of the groove 60 in the inboard end of the flame cone, and a height thereof which is substantially the same as the depth of the groove. By this means, the ridge 66 of the rocket is adapted to be snugly and operatively received within the groove 60 in the exterior wall 70 of the inboard end of the flame cone. This first socket cavity 70 is geometrically designed to provide an internal cavity of a size and depth suitable to matingly and snugly receive within such cavity the outer circumference 78 of the inboard end of the flame cone, thereby assuring full engagement of the socket with the inboard end of the flame cone.

By this means, the only tool adapted to be fitted onto the inboard end of the flame cone is the tool of the present invention. Therefore, an installer can not "mix and match" any known existing tool or combination of tools which are not adapted to be applied to the flame cone in a manner which always assumes a fixed established alignment of the tool with the flame cone in a chosen registered rotational position, as an aid in the threading of the flame cone into the throughbore in accordance with the present invention. This mode of interconnection of the socket (tool) with the flame cone therefore provides a first mode of assuring proper installation of the flame cone within the throughbore to achieve the required assurance that the exit port(s) of the flame cone are properly angularly positioned within the combustion chamber of the ICE.

It is to be noted that the tool must include a surface which is visually available to the installer and which is capable of readily displaying the marker 88 on the tool, such, as a colored straight line applied to the tool. Second, the marker must be located at the same rotational position as is the structural rotational positional indicator (groove 60) of the flame cone when the tool is engaged with the inboard end of the flame cone. Since the socket can only engage the flame cone in a single common rotational position, if the socket is physically adaptable for the application of a marker to the side of the socket at a location and of a size where it is readily visible to the installer, such a location of the marker is permissible. However, the present inventors prefer that the socket be affixed or releasably joined to an extension 82 which has an elongated exposed surface 86 onto which the elongated tool marker 88 (e.g., a colored straight line drawn parallel to the length of the extension) may be applied. Such a marker has been found to be readily visible to an installer.

In as much as the contoured first cavity 70 on the first end of the socket which engages the flame cone provides the advantage of exclusive fitting of the socket onto the flame cone in only one rotational orientation of the socket relative to the flame cone, there is opened the possibility that the socket can also be exclusively fitted at its opposite second end 80 to an auxiliary complementary component namely an extension 82, for the tool.

Referring to FIG. 13 in taking advantage of the latter possibility, in one embodiment, the present inventors provide the second end 80 of the socket which is outboard of the interconnection of the socket with the end of the flame cone, with a uniquely contoured second cavity 98 adapted to receive therein only a matingly uniquely contoured end 94 of the elongated extension, for example, so that such end of the extension will only matingly fit into the unique geometry of the second cavity within the outboard end of the socket. Such extensions may be provided in different lengths (see FIG. 18) to further enhance access by the installer to the flame cone where access to throughbores is restricted, or encumbered by components of the ICE which are located adjacent the head. This unique geometry of the cavity in the second end of the socket is different from the geometry of the inboard end of the flame cone so that the extensions may not be directly connected to a flame cone. The unique design of the outboard end of the socket, there may be defined within the outboard second end 80 of the socket, a second cavity 98 having a cross-section in the general form of a triangle (see FIG. 13) having an outwardly slightly curved base 100 and first and second sides 102 and 104, each side also being slightly outwardly curved. In this embodiment, each separate elongated extension is contoured at one end 94 thereof with a cross section of complementary mating geometry with the second cavity defined in the outboard end of the socket. In this embodiment, the contoured 94 end of the extension may be releasably insertable into the triangular second cavity in the socket, thereby connecting the socket on the end of the extension to provide a longer "reach" for accessing a flame cone to be installed in a throughbore of the ICE.

In either of the foregoing embodiments, the extension presents an elongated outer surface onto which there may be provided an elongated straight line marker (colored, for example). As noted, this marker is positioned on the extension so as to be aligned in register with the 12 O'clock marker when it is engaged with the rotational position indicator on the flame plug and therefore is suitable for indicating the rotational position of the flame cone and its exit ports.

As depicted in FIGS. 14 and 15 in accordance with one aspect of the present invention, there is provided a 12 O'clock marker 76 on the head of the ICE proximate the throughbore in a location which is visually available to the installer. In the present invention, the marker 76 on the ICE head is vertical and aligned with an extended diameter of the throughbore and is designated the 12 O'clock position in a clock face technique for judging relative rotational positions of the tool relative to the fixed 12 O'clock marker on the head of the ICE.

In the present invention, the visually available tool marker 88 (which may be a colored straight line, for example) on the tool at a location aligned with, hence indicative of, the position of the ridge of the tool which mates with the rotational position indicator of the flame cone. Thus, when the tool is engaged with the flame cone, the installer is assured that any rotational movements of the tool produces like rotational movements of the exit port.

Once the flame cone and its initially applied washer, is seated on the stop, employing the tool of the present invention and the torque level established by the manufacturer of the ICE and employing the clock face method for identification of the relative rotational positions of an two objects, the installer may visually judge, from the installer's location externally of the ICE, the degree of rotational alignment or misalignment of the marker on the tool relative to the marker on the head of the ICE, hence the degree of rotational alignment or misalignment of the flame cone relative to the 12 O'clock position, hence the degree of alignment or misalignment of the required angular orientation of the chosen exit port disposed within the combustion chamber of the ICE.

Using this clock face technique in the present invention the 12 O'clock position is defined on the head of the ICE as a vertical 96 taken along all extended diameter of the throughbore into which the flame cone is being threaded. (See FIGS. 14 and 15). After the flame cone and its initial washer are seated against the circumferential internal shoulder of the throughbore, the installer notes the location of the marker on the tool employed in threading of the flame cone into the throughbore, relative to the 12 O'clock marker. By way of example and as depicted in FIG. 15, the noted clock position of the marker on the tool might be 2 O'clock. Since the rotational position of the tool marker is at all times indirectly aligned with the rotational position the exit port in question, the installer understands that the alignment or misalignment of the marker on the tool from the 12 O'clock position means that the flame cone, hence the exit port in question is likewise either aligned or misaligned within the combustion chamber. If at this juncture the installer notes alignment of the tool maker with the head marker (see FIG. 14), the flame cone is properly seated within the throughbore and the spark plug may be threaded into the inboard end of the flame cone to complete the installation process.

Where as in the above 2 O'Clock example, the installer, upon having noted such rotational misalignment position of the flame cone, removes the flame cone and its original washer from the throughbore.

Employing a lookup table, the noted 2 O'clock position (for example) is matched to a spacer washer of appropriate thickness e.g. 0.018 inch per the look up table (FIG. 16), which when applied on the outboard end of the flame cone, along with the original washer, will alter the depth to which the flame cone can be threaded into the throughbore and thereby cause the marker on the tool to be in register with the 12 O'clock marker position on the head when the flame cone and its washer(s) are properly reinstalled within the throughbore, thereby indicating that the exit port(s) are properly oriented within the combustion chamber.

More specifically, the installer fits the newly chosen spacer washer and the flat or conical washer (in the case of a contoured shoulder) which was used on the flame cone when initially threading the flame cone into the throughbore onto the inboard end of the flame cone and the flame cone is again threaded into the throughbore employing the originally used tool and torque value. If at this point, the marker on the tool is in register with the 12 O'clock position on the head, there is assurance that the exit ports on the outboard end of the flame cone are properly angularly oriented within the combustion chamber of the ICE. Under these conditions, the spark plug is threaded into the outboard end of the flame cone to complete the installation process of the present invention.

Should the noted registration of the rotational position of the tool marker with the 12 O'clock position not be achieved with these initially chosen washer(s), the process of choosing a washer (or multiple washers) of the proper thickness is repeated until there is achieved the desired registration of the marker on the tool and the 12 O'clock position marker on the head.

In one aspect of the present invention, there may be provided a kit 112 containing those components of the present invention needed for installation of a selected number of spark plugs in a given ICE. For example, such kit may comprise a clam shell type container 114 which houses a single flame cone, suitable washers (flat or conical), a plurality of spacer washers of respective identified thicknesses (all flat), and a tool of the present invention. Optionally, a chalk or like marker may be included in the kit for marking the 12 O'clock position for each throughbore and/or printed instructions for installing the spark plugs, including available torque values to be employed in seating the flame cone within a throughbore and/or for seating a spark plug within the inboard end of a flame cone. Also optionally, the kit may include that a suitable number of spark plugs for a given ICE.

Referring to FIG. 2 where the shoulder within the throughbore is conical in shape, the present method comprises the following steps:

A. apply a visually observable marker on the head of an ICE in alignment with a vertical aligned with a diameter of a throughbore in the head.

B. select a flame cone suitable for use in the ICE in question;

C. select a initial flat space washer having a thickness of about 0.010 inch;

D. position the initial flat spacer washer about the threaded outboard end of the flame cone;

E. select a conical washer adapted to occupy and fill the conical shoulder to convert the conical shoulder into a fat shoulder;

F. position the conical washer about the threaded outboard end of the flame cone in overlying relationship to the flat initial spacer washer;

G. thread the flame cone into the throughbore, employing a tool of the present invention having a rotational position marker visually displayed on the tool, to that torque value specified by the ICE manufacturer;

H. employing the clock face technique, note the hour which is closest to the rotational position of the rotational position marker on the tool;

I. employing a lookup type table which correlates hour units with selected spacer washer thicknesses; select a flat space washer which corresponds to the hour unit noted in step H;

J. if it is noted that the rotational position indicator on the tool is closest to the identified 12 O'clock, the flame cone is aligned properly within the throughbore and the spark plug may be then inserted into the inboard end of the flame cone.

K. if the rotational position of the indicator on the tool is noted to be closer to some hour other than 12 O'clock, for example 2 O'clock, use the lookup table to select a flat spacer washer identified in the table as to be used for correcting the noted 2 O'clock misalignment of the flame cone within the throughbore;

L. replace the initial 0.010 thick spacer washer with the 2 O'clock spacer washer and overlie such latter spacer washer with the initial conical washer;

M. thread the flame cone into the throughbore employing a tool of the present invention to that torque value specified by the ICE manufacturer;

N. employing the clock face technique, note the hour which is closest to the rotational position of the rotational position marker on the tool to the 12 O'clock position identified on the ICE head;

O. if the rotational position indicator on the tool is closest to 12 O'clock, the flame cone is properly seated within the throughbore and the spark plug is thereupon threaded into the inboard end of the flame cone to complete the installation;

P. if the rotation position marker of the tool is aligned closest to an hour position other than 12 O'clock, remove the spark plug from the flame cone, withdraw the flame cone from the throughbore, and repeat steps I-O until a proper spacer washer has been chosen and tested to show its ability to limit the seating of the flame cone such that the rotational position marker of the tool is aligned closest to the 12 O'clock position. Once the flame cone is so aligned, insert the spark plug into the flame cone to complete the installation.

Referring to FIG. 1, when the shoulder in the throughbore is flat, the steps of the foregoing installation method are substantially the same in all respects, other than the choice of the initial washer employed on the flame cone. Where the internal circumferential shoulder of the throughbore onto which the flame cone is to be seated, is flat in geometry, the installer employs only an initial flat spacer washer of 0.10 inch thickness. To adjust the rotational alignment of the flame cone, the initial flat spacer washer may be replaced with a spacer washer of a different thickness or, if desired, a second (or more) spacer washer may be overlaid over the initial flat spacer washer to thereby limit the depth of permissible threading of the flame cone into the throughbore. In all instances the outer diameter of each of the washers (conical or flat) is the same and further is chosen such that each washer fits snugly within the inner diameter of the flame cone in the region adjacent the circumferential shoulder of the flame cone. For use in pre-ignition systems, the washers serve the further purpose of effecting a gas-tight seal between the outboard end of the flame cone and the shoulder of the flame cone.

The present inventors have found that the 0.010 inch minimum spacer flat washer thickness is reasonably manufactured and that such minimum thickness is relatively more likely to result in the initial seated depth of the flame cone into the throughbore being that depth which aligns the flame cone properly within the throughbore when the flame cone is torqued to a manufacturer's directed value. Thus, the use of this relatively thin flat washer most often results in the initial insertion of the flame cone into the throughbore achieving the proper seating of the flame cone onto the circumferential shoulder inside the throughbore, thereby maximizing time and effort consumed in the overall installation of the flame cone within the throughbore in proper rotational alignment.

In the depicted embodiment of FIGS. 1 and 2, the throughbore 12 through the wall 14 of the head 10 of the ICE includes a first outboard open end portion and an inboard open end portion 56. The outboard open end portion 46 of the throughbore 12 in the depicted embodiment may have smooth inner and outer surfaces and a diameter which is materially greater that the outer diameter of a conventional spark plug suitable for use in the depicted head of the ICE, thereby defining a void open annular space 52 between the inner surface 48 of the throughbore and the spark plug and the inboard end of the flame cone. This annular space is useful for the receipt therein of a tool of the present invention for insertion of the flame cone into the through bore.

What is claimed is:

1. A method for installation of a flame cone of a pre-ignition system for ignition of a combustible fuel/gas mixture within a combustion chamber of an internal combustion engine, the flame cone having an inboard end and an outboard end, a longitudinal centerline, and at least one exit port rotationally oriented about said longitudinal centerline, comprising the steps of:

a. providing a physically structural rotational position indicator on the inboard end of the flame cone, said rotational position indicator mimicking the rotational position of the at least one exit port about the longitudinal centerline of the flame cone, b. providing a tool which is uniquely adapted to engage said rotational position indicator for threading said flame cone into said throughbore, said tool including a visible marker which is aligned with said rotational position indicator on said flame cone, whereby noted rotational movements of said tool are indicative of the rotational position of said flame cone, hence the rotational position of said at least one exit port;

c. inserting the flame cone and its initially applied washer to a first depth into the throughbore, d. providing a 12 O'clock point of reference on said cylinder head proximate said throughbore and which is visible from a location external of the internal engine, e. from a location external of the head of the internal combustion engine and employing said tool, inserting said flame cone into said throughbore to a predetermined depth of sealingly engagement between the flame cone and the throughbore;

f. thereupon, noting the rotational orientation of said marker on said tool relative to the 12 O'clock marker on said head;

g. providing a plurality of flat spacer washers of differing individual thicknesses;

h. providing a lookup table which identifies the thickness of a space washer which, when applied to that end of said flame cone which is inserted into the throughbore, will adjust the depth of insertion of the flame cone into the throughbore by an amount which will cause said marker on said tool to be relocated closer to alignment of said rotational position marker on said tool, with the 12 O'clock marker on said head;

i. for any noted degree of misalignment of said marker on said tool from said 12 O'clock marker, employing said lookup table, selecting a spacer washer appropriate for adjusting the depth of insertion of the flame cone into said throughbore to cause said marker on said tool to move toward alignment with the 12 O'clock marker on said head;

j. mounting said selected washer on that end of said flame cone which is insertable into said throughbore;

k. employing said tool, reinserting said flame cone and said selected washer into said throughbore to a depth of sealing engagement between the flame cone and the throughbore;

l. repeating steps (e) through (k).

2. The method of claim 1 wherein said tool is exclusively adapted for engagement with said inboard end of said flame cone.

3. The method of claim 2 and including the step of defining a physically structural rotational position indicator proximate said inboard end of said flame cone and defining a physically structural element associated with said tool and which is adapted to physically engage said rotational position indicator when said tool is applied to said flame cone in the course of threading said flame cone into said throughbore.

4. The method of claim 3 and including the step of aligning said rotational position indicator of said flame cone and said physically structural element of said tool whereby when said tool is in engagement with said flame cone, said physically structural element of said tool is in rotational alignment of said rotational position indicator of said flame cone, hence rotational alignment of said tool, with said exit port.

5. The method of claim 4 and including the step of providing a marker on said head adjacent said throughbore, said marker being aligned with a vertical in longitudinal alignment with a diameter of said flame cone to define a 12 O'clock position in a clock face technique for visually judging rotational alignment of said tool, hence said rotational position indicator of said flame cone, hence the rotational orientation of said exit port.

6. Apparatus for installation of a spark plug into a throughbore in the head of an internal combustion engine from a location external of, and while the head is mounted on, such engine, said head including a 12 O'clock marker thereon which is visible from a location external of said head comprising a flame cone of a pre-ignition-system for ignition of a combustible fuel/gas mixture within a combustion chamber of an internal combustion engine, the flame cone having an inboard end and an outboard end, a longitudinal centerline, and at least one exit port associated with said outboard end of said flame cone, and an open channel defined between said inboard end of said flame cone and said at least one exit port, and thread adjacent said outboard end of said flame cone adapted to provide for threaded insertion of said flame cone into said throughbore of said head, a physically structural rotational position indicator defined in the wall of said inboard end of said flame cone at a rotational location about said longitudinal centerline wherein said indicator is linearly aligned with said at least one exit port, a tool adapted to exclusively engage said inboard end of said flame cone for rotational movement of said flame cone for purposes of seating said flame cone within said throughbore, said tool including a socket-type element having a first end cavity and an opposite second end cavity, said socket-type element including a physically structural rotational position indicator defined internally thereof, said element being geometrically adapted to be received in snug relationship to said indicator in said wall of said flame cone whereby rotation of said socket-type element effects like rotation of said flame cone, and an extension element adapted to be exclusively engaged with said second end of said socket-type element for effecting rotation of said socket-type element, and, a marker defined on said tool in position to be simultaneously visible with said 12 O'clock marker on said head from a location external of the head.

7. The tool of claim 6 wherein said rotational position indicator associated with said flame cone comprises an elongated groove and said rotational position indicator associated with said socket-type element of said tool comprises an elongated ridge which is geometrically shaped to matingly engage said groove for purposes of rotation of said flame cone upon rotation of said socket-type element of said tool.

8. The tool of claim 6 wherein said marker defined on said tool is disposed on said extension element.

9. The tool of claim 8 wherein said marker defined on said tool is disposed on said socket-type element and on said extension.

* * * * *